United States Patent
Yamada et al.

(10) Patent No.: US 9,225,896 B2
(45) Date of Patent: Dec. 29, 2015

(54) MOBILE TERMINAL DEVICE, STORAGE MEDIUM, AND DISPLAY CONTROL METHOD

(71) Applicant: KYOCERA Corporation, Kyoto (JP)

(72) Inventors: Seiji Yamada, Daito (JP); Masuo Kondo, Neyagawa (JP); Masayuki Ono, Akashi (JP)

(73) Assignee: KYOCERA Corporation, Kyoto (JP)

(*) Notice: Subject to any disclaimer, the term of this patent is extended or adjusted under 35 U.S.C. 154(b) by 151 days.

(21) Appl. No.: 13/682,708

(22) Filed: Nov. 20, 2012

(65) Prior Publication Data

US 2013/0135511 A1    May 30, 2013

(30) Foreign Application Priority Data

Nov. 24, 2011  (JP) .................................. 2011-255864

(51) Int. Cl.
  *H04N 5/232* (2006.01)
  *H04N 5/222* (2006.01)

(52) U.S. Cl.
  CPC ........... *H04N 5/23219* (2013.01); *H04N 5/222* (2013.01); *H04N 5/23293* (2013.01)

(58) Field of Classification Search
  CPC ....................... H04N 5/23219; H04N 5/23293
  USPC .................................................. 348/333.01
  See application file for complete search history.

(56) References Cited

U.S. PATENT DOCUMENTS

| 2004/0230904 | A1  | 11/2004 | Tada |  |
| 2006/0140620 | A1* | 6/2006 | Fujii | 396/287 |
| 2010/0134642 | A1* | 6/2010 | Thorn | 348/222.1 |
| 2010/0259473 | A1* | 10/2010 | Sakata et al. | 345/156 |
| 2011/0116685 | A1* | 5/2011 | Sugita | 382/103 |
| 2012/0327123 | A1* | 12/2012 | Felt | 345/660 |

FOREIGN PATENT DOCUMENTS

| JP | 2001-228848 | A | 8/2001 | |
| JP | 2002-347539 | * | 12/2002 | ............... G06T 7/20 |
| JP | 2004-287168 | A | 10/2004 | |
| JP | 2006-023953 | | 1/2006 | |
| JP | 2011-060215 | A | 3/2011 | |

OTHER PUBLICATIONS

Notification of Reasons for Refusal dated Jan. 27, 2015 issued in counterpart Japanese application No. 2011-255864 and Concise Explanation.
Notification of Reasons for Refusal dated Aug. 25, 2015 issued in counterpart Japanese application No. 2011-255864 and Concise Explanation.

* cited by examiner

*Primary Examiner* — James Hannett
(74) *Attorney, Agent, or Firm* — Procopio, Cory, Hargreaves & Savitch, LLP

(57) ABSTRACT

A mobile terminal device includes a display module which displays a screen; a photographing module which is configured to face substantially the same direction as the screen; a determining module which determines, based on an image photographed by the photographing module, whether a state of a user facing the screen coincides with a predetermined determination condition indicating that the user has difficulty in browsing the screen; and a display changing module which changes a current display manner of the screen to a display manner that enhances visibility of characters displayed on the screen, as compared with the current display manner, based on a determination result by the determining module that the state of the user coincides with the determination condition.

7 Claims, 14 Drawing Sheets

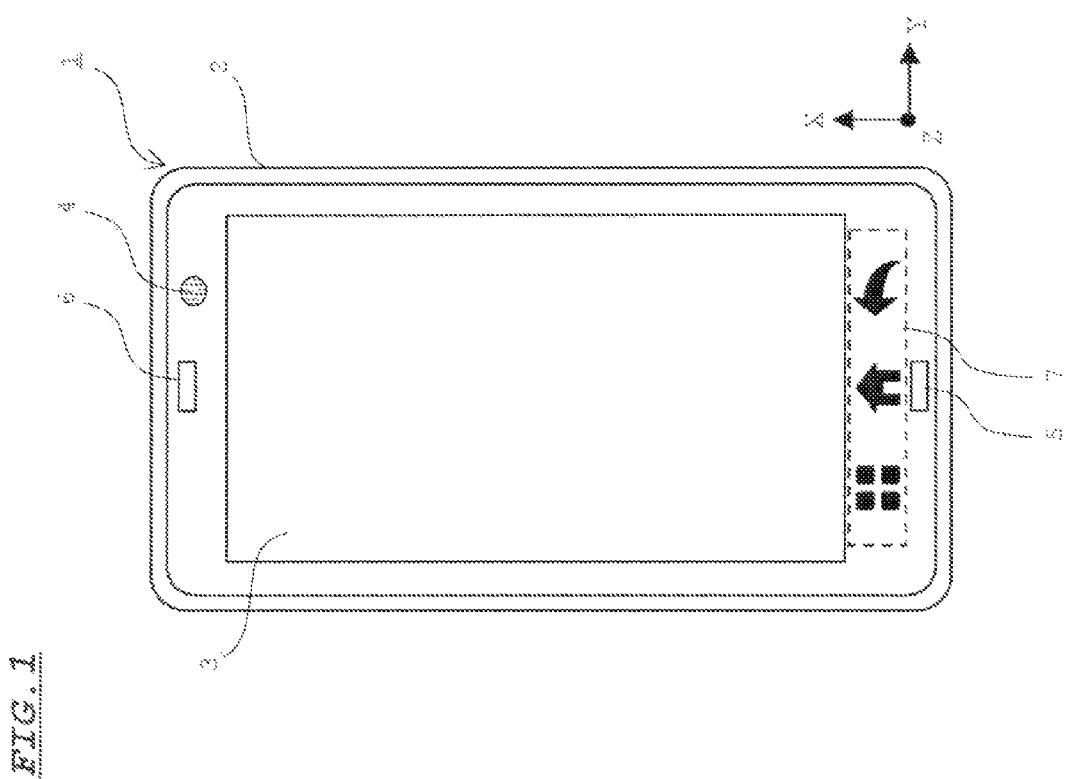

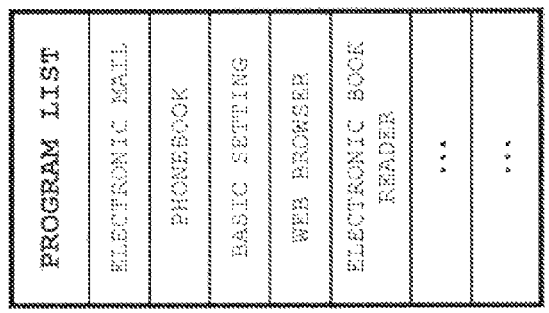
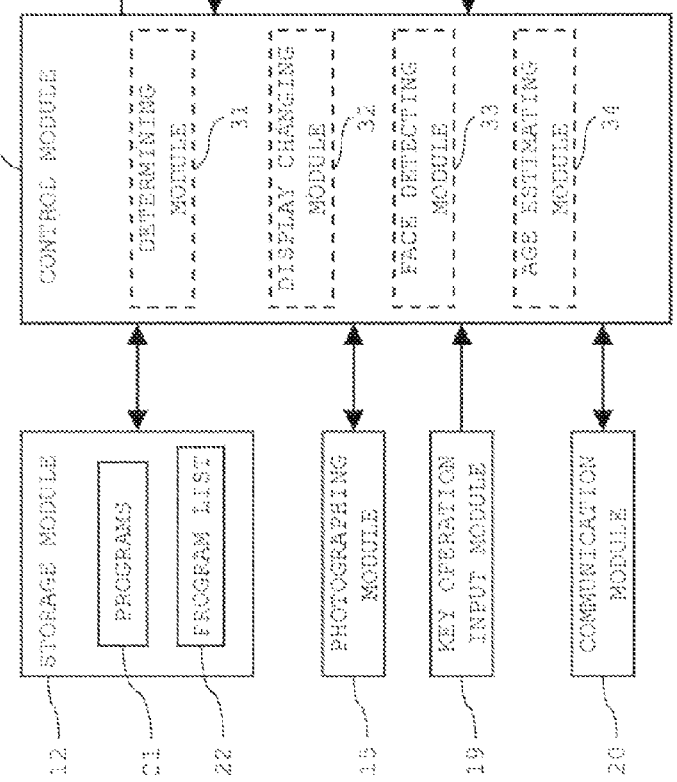

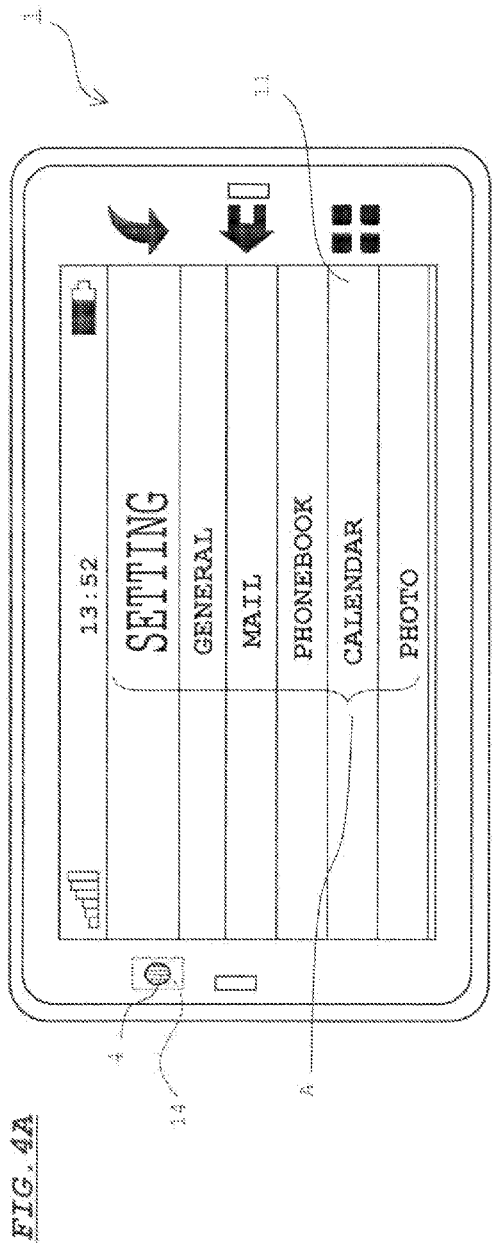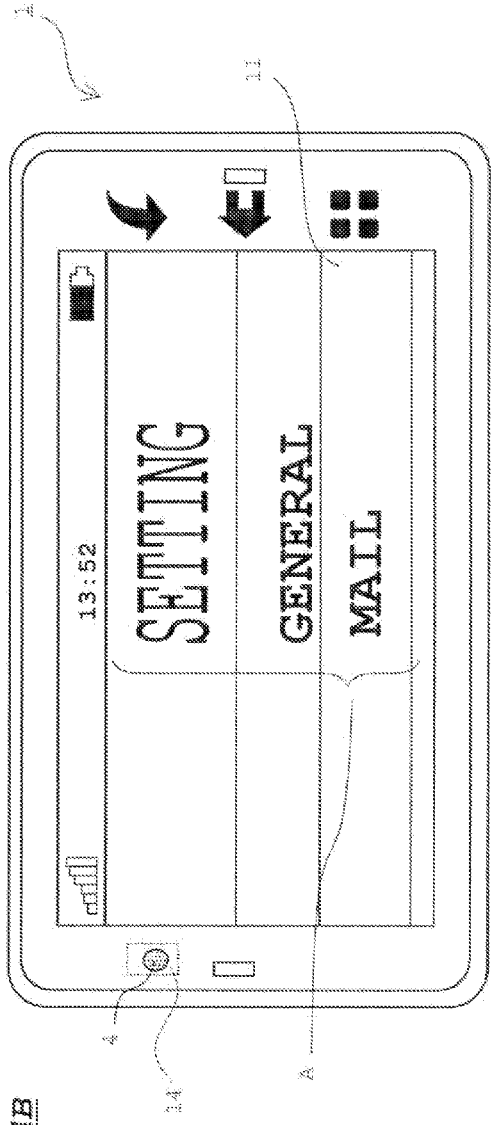

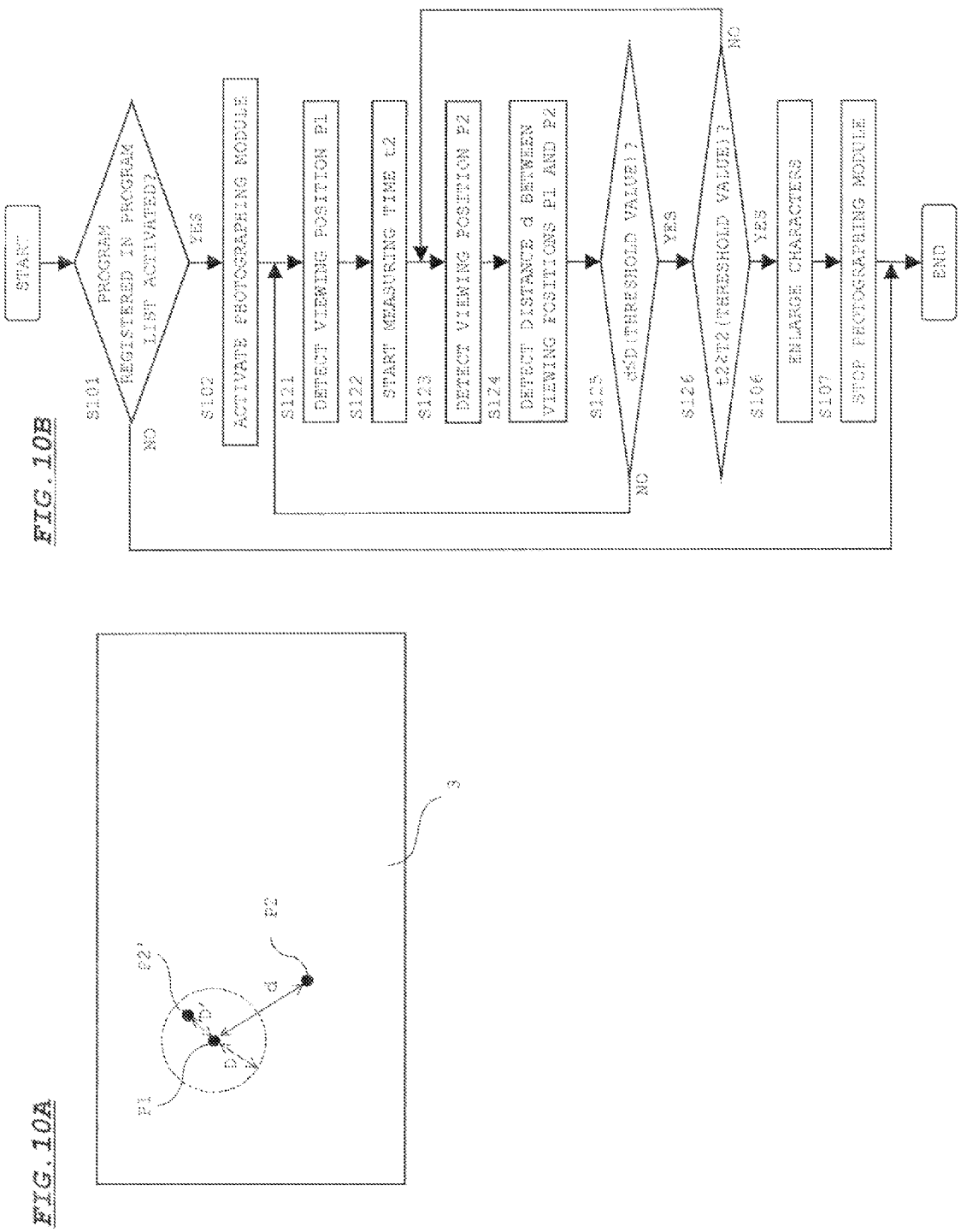

MOBILE TERMINAL DEVICE, STORAGE MEDIUM, AND DISPLAY CONTROL METHOD

This application claims priority under 35 U.S.C. Section 119 of Japanese Patent Application No. 2011-255864 filed Nov. 24, 2011, entitled "MOBILE TERMINAL DEVICE, PROGRAM, AND DISPLAY CONTROL METHOD". The disclosure of the above application is incorporated herein by reference.

BACKGROUND OF THE INVENTION

1. Field of the Invention

The present invention relates to a mobile terminal device such as a mobile phone, a PDA (Personal Digital Assistant), a tablet PC, and an electronic book reader; a storage medium storing a computer program suitable for use in the mobile terminal device; and a display control method suitable for use in the mobile terminal device.

2. Disclosure of Related Art

Conventionally, there has been known a mobile terminal device capable of changing the size of characters displayed on a screen of the mobile terminal device in response to user's manipulation.

In the aforementioned mobile terminal device, however, user's manipulation is necessary to enlarge the characters. Accordingly, in the case where the user does not know how to enlarge the characters, for instance, the user cannot promptly enlarge the characters, regardless of the user's intention.

In the case where the user faces a situation that the user has difficulty in browsing a screen including characters, it is desirable to change the display manner of the screen in such a way as to enhance the visibility of the characters by e.g. enlarging the characters, as necessary.

SUMMARY OF THE INVENTION

A first aspect of the invention is directed to a mobile terminal device. The mobile terminal device according to the first aspect includes a display module which displays a screen; a photographing module which is configured to face substantially the same direction as the screen; a determining module which determines, based on an image photographed by the photographing module, whether a state of a user facing the screen coincides with a predetermined determination condition indicating that the user has difficulty in browsing the screen; and a display changing module which changes a current display manner of the screen to a display manner that enhances visibility of characters displayed on the screen, as compared with the current display manner, based on a determination result by the determining module that the state of the user coincides with the determination condition.

A second aspect of the invention is directed to a storage medium which stores a computer program to be applied to the mobile terminal device. The mobile terminal device is provided with a display module which displays a screen, and a photographing module which is configured to face substantially the same direction as the screen. The computer program provides a computer in the mobile terminal device with a function of determining, based on an image photographed by the photographing module, whether a state of a user facing the screen coincides with a predetermined determination condition indicating that the user has difficulty in browsing the screen, and a function of changing a current display manner of the screen to a display manner that enhances visibility of characters displayed on the screen, as compared with the current display manner, based on a determination result that the state of the user coincides with the determination condition.

A third aspect of the invention is directed to a display control method for a mobile terminal device provided with a display module which displays a screen, and a photographing module which is configured to face substantially the same direction as the screen. The display control method according to the third aspect includes a step of determining, based on an image photographed by the photographing module, whether a state of a user facing the screen coincides with a predetermined determination condition indicating that the user has difficulty in browsing the screen, and a step of changing a current display manner of the screen to a display manner that enhances visibility of characters displayed on the screen, as compared with the current display manner, based on a determination result that the state of the user coincides with the determination condition.

BRIEF DESCRIPTION OF THE DRAWINGS

These and other objects, and novel features of the present invention will become more apparent upon reading the following detailed description of the embodiment along with the accompanying drawings.

FIG. 1 is a diagram showing an external configuration of a mobile phone embodying the invention.

FIGS. 2A and 2B are respectively a block diagram showing the overall configuration of the mobile phone, and a table showing an example of a program list in the embodiment.

FIGS. 4A and 4B are diagrams respectively showing a screen before characters are enlarged by a display changing module, and a screen after the characters are enlarged by the display changing module in the embodiment.

FIG. 10A is a diagram for describing a viewing position on a display surface in the second modification, and FIG. 10B is a flowchart showing a display control processing in the second modification.

DESCRIPTION OF PREFERRED EMBODIMENTS

Figure 3B:
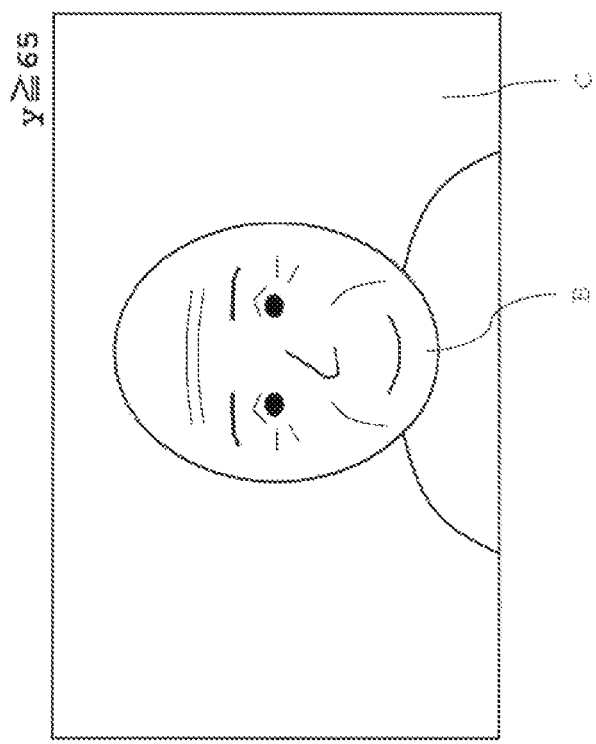
FIGS. 3A and 3B are diagrams each showing an example of a photographed image, and an image of a user's face included in the photographed image in the embodiment.

In the following, an embodiment of the invention is described referring to the drawings.

FIG. 1 is a front view showing an external configuration of a mobile phone 1.

The mobile phone 1 is provided with a cabinet 2, a display surface 3, a lens window 4, a microphone 5, a speaker 6, and a key operation part 7.

The display surface 3 is disposed on the front surface of the cabinet 2. The display surface 3 corresponds to a display plane of a display module (see FIG. 2A) to be described later. A screen is displayed on the display surface 3.

The lens window 4 is formed in such a manner as to face the front side of the cabinet 2, in other words, face the direction in which a screen to be displayed on the display surface 3 is disposed. An image of a subject facing the front side of the cabinet 2, such as the face of a user browsing a screen is captured by a photographing module 15 through the lens window 4.

The microphone 5 outputs an electrical signal in accordance with an inputted sound to a sound processing module (see FIG. 2A) to be described later. The speaker 6 outputs a sound in accordance with an electrical signal to be inputted from the sound processing module.

The key operation part 7 is provided on the cabinet 2. The key operation part 7 is composed of keys such as soft keys and hard keys. Various functions in accordance with e.g. a running program are assigned to the respective keys.

FIG. 2A is a block diagram showing the overall configuration of the mobile phone 1.

The mobile phone 1 is provided with a control module 11, a storage module 12, a display module 13, an operation input module 14, the photographing module 15, a sound input module 16, a sound output module 17, a sound processing module 18, a key operation input module 19, and a communication module 20.

The storage module 12 is constituted of e.g. an ROM and an RAM. The storage module 12 stores therein programs 21. The programs 21 are constituted of a control program for controlling the modules of the mobile phone 1, and various application programs (hereinafter, simply called as "applications") (such as an electronic mail application, a browser application, a phonebook application, and an electronic book browser application). The programs 21 also include programs for executing the functions of a determining module 31, a display changing module 32, a face detecting module 33, and an age estimating module 34 to be described later.

The storage module 12 is also used as a working area which stores data to be temporarily used or generated in the course of executing the programs 21.

The control module 11 is constituted of e.g. a CPU. The control module 11 executes various applications by controlling the modules constituting the mobile phone 1 such as the storage module 12, the display module 13, the operation input module 14, the photographing module 15, the sound output module 17, the sound input module 16, the sound processing module 18, and the key operation input module 19 in accordance with the control program.

The display module 13 displays a screen on the display surface 3, based on a control signal and an image signal from the control module 11. The display module 13 is constituted of e.g. a liquid crystal display. The display module 13 may be constituted of other display device such as an organic EL display, in place of a liquid crystal display.

The operation input module 14 is constituted of e.g. a touch sensor for detecting contact of an object such as a user's fingertip or a touch pen (hereinafter, simply called as "the fingertip") with the display surface 3. The touch sensor is integrally formed with the liquid crystal display to thereby constitute a touch panel. The touch sensor is formed into a transparent sheet-like member, and is disposed in such a manner as to cover the display surface 3.

The operation input module 14 receives user's input of touching the display surface 3. The operation input module 14 detects a position on the display surface 3 where the fingertip has touched, as an input position; and outputs a position signal indicating the detected input position to the control module 11.

The user is allowed to perform various manipulations such as touching, tapping, sliding, and flicking on the display surface 3 by contacting the fingertip with the display surface 3. In the specification, "touching" is a manipulation of touching the display surface 3 with the fingertip; "tapping" is a manipulation of tapping the display surface 3 with the fingertip, followed by releasing the fingertip from the display surface 3; "flicking" is a manipulation of flicking the display surface 3 with the fingertip (manipulation of touching the display surface 3 with the fingertip, followed by moving the fingertip at a certain speed on the display surface 3 and releasing the fingertip from the display surface 3); and "sliding" is a manipulation of slidably moving the fingertip on the display surface 3 by a certain distance while keeping the fingertip in contact with the display surface 3, followed by releasing the fingertip from the display surface 3.

The touch sensor constituting the operation input module 14 may be any one of various types of touch sensors such as electrostatic capacitive sensors, ultrasonic sensors, pressure sensitive sensors, resistive sensors, and photosensitive sensors.

The photographing module 15 is constituted of an imaging element such as a CCD sensor or a CMOS sensor for sensing a light image entered through the lens window 4, an A/D conversion circuit which performs A/D conversion to a signal outputted from the imaging element, and a correction circuit which applies correction (such as gamma correction) to a signal which has undergone A/D conversion. The photographing module 15 transmits, to the control module 11, a digital signal representing an image (hereinafter, called as a "photographed image"), which has been generated by a photographing operation.

The sound input module 16 is constituted of e.g. the microphone 5. The sound input module 16 outputs an electrical signal from the microphone 5 to the sound processing module 18.

The sound output module 17 is constituted of e.g. the speaker 6. The sound output module 17 inputs an electrical signal from the sound processing module 18, and outputs a sound from the speaker 6.

The sound processing module 18 performs e.g. A/D conversion to an electrical signal from the sound input module 16, and outputs a digital sound signal which has undergone A/D conversion to the control module 11. The sound processing module 18 performs e.g. decoding and D/A conversion to a digital sound signal from the control module 11, and outputs an electrical signal which has undergone D/A conversion to the sound output module 17.

The key operation input module 19 outputs, to the control module 11, a signal corresponding to each key in response to user's depressing the keys in the key operation part 7.

The communication module 20 is provided with an antenna for transmitting/receiving radio wave for use in phone call or communication. The communication module 20 converts a signal for use in phone call or communication to be inputted from the control module 11 into a radio signal, and transmits the converted radio signal to a communication destination such as a base station or other communication device via the antenna. Further, the communication module 20 converts the radio signal received via the antenna into a signal of a format usable by the control module 11, and outputs the converted signal to the control module 11.

The mobile phone 1 of the embodiment has a function of automatically determining whether it is necessary to enlarge the characters for enlarging the on-screen characters. To run a program for executing the aforementioned function, the storage module 12 stores a program list 22; and the control module 11 is provided with the determining module 31, the display changing module 32, the face detecting module 33, and the age estimating module 34. The program list 22 corresponds to "information" in claim 6.

FIG. 2B is a table showing an example of the program list 22. In the program list 22, there is registered, as one of the programs 21 to which a determining processing (to be executed by the determining module 31) of determining whether character enlargement is necessary, a program for displaying a screen mainly composed of characters in executing various applications such as an electronic mail application, a phonebook application, a basic setting application, a web browser application, and an electronic book browser application.

The determining module 31 determines whether the user facing the display surface 3 has difficulty in browsing the screen, based on a photographed image acquired by the photographing module 15.

Figure 3A:
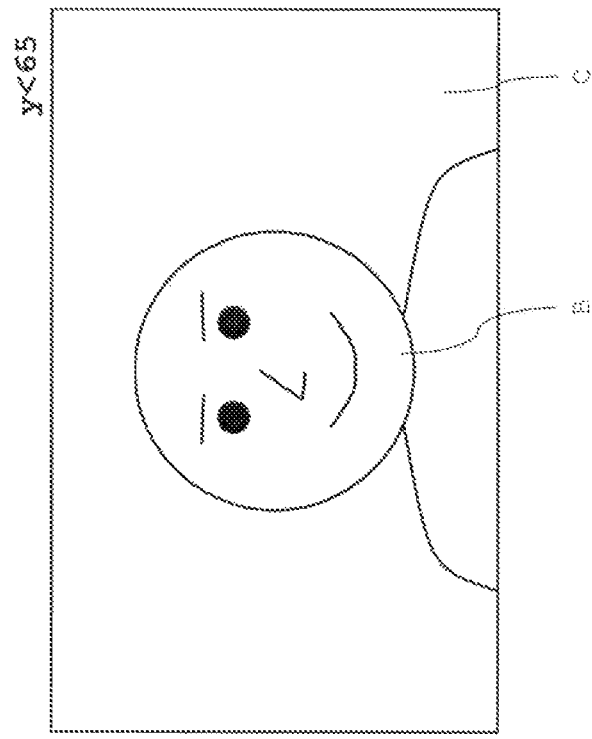

FIGS. 3A and 3B are diagrams each showing an example of a photographed image C acquired by the photographing module 15, and a user's face B included in the photographed image C. In the case where the user uses the mobile phone 1, in response to driving of the photographing module 15, the photographing module 15 photographs the front side of the cabinet 2 (a region where the user's face is included). By performing the above operation, the control module 11 acquires, from the photographing module 15, a photographed image C including the face B of a young man as shown in e.g. FIG. 3A, or a photographed image C including the face B of an old man as shown in e.g. FIG. 3B.

The determining module 31 determines whether the user has difficulty in browsing the screen, based on a predetermined determination condition relating to the photographed image C. Firstly, the age y of the user is estimated, based on the photographed image C including the user's face B by the face detecting module 33 and the age estimating module 34 to be described later. The determining module 31 determines whether the estimated age y is equal to or larger than a predetermined threshold value Y (e.g. Y=65). In this example, the threshold value Y is set to a value in the range of from about 50 to 90.

In the case where the user is an elderly person, it is highly likely that the user has difficulty in discerning the characters of an ordinary size on a screen due to e.g. deterioration of eyesight. In the case where the determining module 31 determines that the estimated age of the user is equal to or larger than the threshold value Y, the determining module 31 determines that the user has difficulty in browsing the screen because the user is an elderly person.

For instance, the determining module 31 determines that $y<65$ with respect to the photographed image C shown in FIG. 3A, and determines that $y \geq 65$ with respect to the photographed image C shown in FIG. 3B.

The display changing module 32 controls the display module 13 to enlarge the characters on a screen displayed on the display surface 3.

For instance, the display changing module 32 enlarges and displays a part of a screen displayed on the display surface 3 to a size corresponding to the entirety of the display surface 3 in enlarging the characters. Alternatively, the display changing module 32 may change the font and the size of the characters, while substantially keeping the overall layout on the screen.

FIGS. 4A and 4B are diagrams respectively showing an example of a screen before the characters are enlarged by the display changing module 32, and an example of a screen after the characters are enlarged by the display changing module 32. Referring to FIGS. 4A and 4B, a screen for basic setting is displayed on the display surface 3. In this example, the program 21 relating to "basic setting" is a program for allowing the user to perform various settings (e.g. character size setting, communication setting, sound setting, and security setting) relating to the overall usage environment of the mobile phone 1. The "basic setting" program is registered in the program list 22 (see FIG. 2B).

The characters A are displayed on the screens shown in FIGS. 4A and 4B.

In the case where the determining module 31 determines that the user has difficulty in browsing a screen in a state that the basic setting screen is displayed on the display surface 3, as shown in FIG. 4A, the display changing module 32 enlarges the characters A displayed as shown in FIG. 4A into the characters A as shown in FIG. 4B. The characters A after the enlargement shown in FIG. 4B are relatively larger than the characters A shown in FIG. 4A.

The details of the face detecting module 33 and the age estimating module 34 are described in the following.

The face detecting module 33 extracts a region mainly composed of a skin color, as a face image candidate, from a photographed image C. Then, the face detecting module 33 detects facial features such as the eyes, the nose, the mouth, and the wrinkles in the extracted region, based on a color or pattern distribution in the region. In the case where a facial feature is detected with a predetermined degree of accuracy in the region, the face detecting module 33 detects the face B from the photographed image C, based on a determination that the region is an area corresponding to the image of the face B.

The age estimating module 34 executes a processing of estimating the age y of the user, from the detected image of the face B. The age estimating module 34 extracts a parameter depending on the age, based on e.g. the shapes and relative positions of facial portions such as the eyes, the nose, the mouth, the ears, and the wrinkles, and the outline of the face B in the image of the face B. The age estimating module 34 estimates the age of the user based on the extracted parameter.

For instance, the age estimating module 34 estimates that the user is twenty-five years old (y=25), based on the image of the user's face B shown in FIG. 3A. Further, the age estimating module 34 estimates that the user is seventy years old (y=70), based on the image of the user's face B shown in FIG. 3B.

The age estimation method is described in detail in e.g. JP-A 09-230751.

Figure 5:
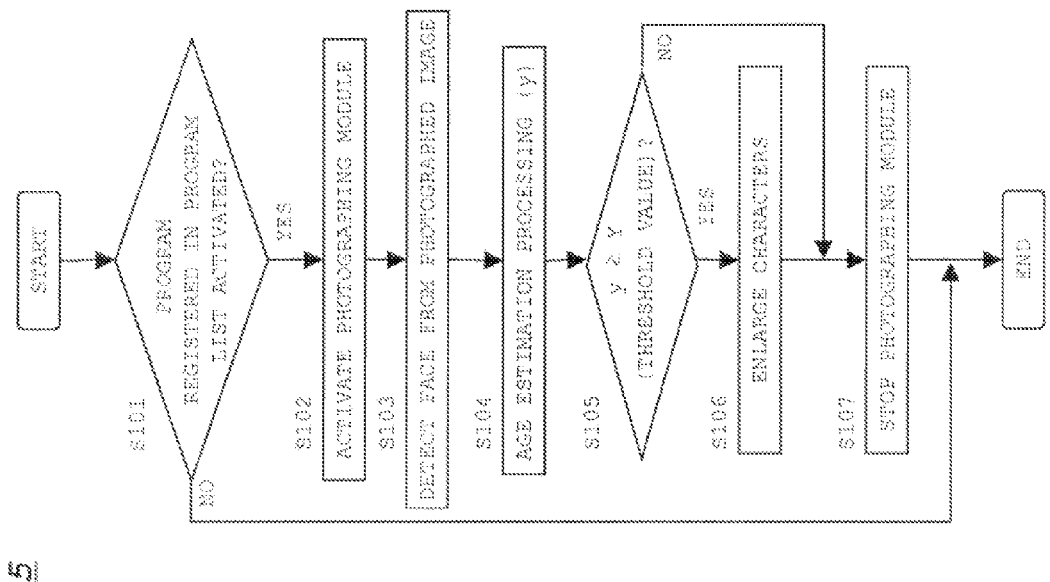
FIG. 5 is a flowchart showing a display control processing in the embodiment.

FIG. 5 is a flowchart showing a display control processing in the embodiment. The display control processing shown in FIG. 5 is started in response to user's activation of a program 21 such as an electronic mail application or a basic setting application.

In the case where the program activated by the user is registered in the program list 22 (S101: YES), the control module 11 activates the photographing module 15 for acquiring a photographed image for use in the determining processing (S102).

In the case where the activated program is not registered in the program list 22 (S101: NO), the control module 11 finishes the display control processing shown in FIG. 5, based on a determination that character enlargement is not necessary.

After the photographing module 15 is activated (S102), the face detecting module 33 detects a user's face B from a photographed image C acquired by the photographing module 15 in the aforementioned manner (S103). The age estimating module 34 estimates the user's age y, based on the image of the face B detected by the face detecting module 33 in the aforementioned manner (S104).

The determining module 31 determines whether the age y estimated by the age estimating module 34 is equal to or larger than the threshold value Y (y≥Y) (S105). For instance, in the case where the determining module 31 determines that the determination condition y≥Y is satisfied as described with respect to the photographed image C shown in FIG. 3B (S105: YES), the display changing module 32 enlarges the characters A on the screen displayed on the display surface 3, as shown in FIG. 4B (S106). After the characters A are enlarged, the control module 11 stops the photographing module 15 (S107), and finishes the display control processing.

The control module 11 may cause the sound output module 17 to reproduce a predetermined sound for notifying the user that the characters A are enlarged by e.g. outputting a message "the characters are enlarged", before the characters A are enlarged in Step S106. By reproducing the sound, the user is allowed to recognize in advance that the display manner of the screen is changed. Alternatively, the control module 11 may cause the display surface 3 to display a message "the characters are enlarged".

In the case where the determination condition y≥Y is not satisfied as described with respect to the photographed image C shown in FIG. 3A, in other words, in the case where the determining module 31 determines that y<Y (S105: NO), the control module 11 stops the photographing module 15, based on a determination that enlargement of the characters A is not necessary (S107), and finishes the display control processing.

As described above, in the configuration of the embodiment, the determining module 31 determines, based on a photographed image C, whether the state of the user facing a screen displayed on the display surface 3 coincides with a determination condition indicating that the user has difficulty in browsing the screen displayed on the display surface 3. In this example, the determination condition is that the age y estimated by the age estimating module 34 exceeds the predetermined threshold value Y. In the case where it is determined that the estimated age y is equal to or larger than the threshold value Y, the display changing module 32 enlarges the characters A on the screen displayed on the display surface 3, based on a determination that enlargement of the characters A is necessary. In other words, the display changing module 32 changes a current display manner of the screen to a display manner that enhances the visibility of the characters A, as compared with the current display manner.

Thus, in the above configuration, a current display manner of a screen is changed to a display manner that enhances the visibility of the characters A, as necessary, in a condition that the user has difficulty in browsing a screen displayed on the display surface 3, and accordingly, the user wishes to enhance the visibility of the characters A.

Further, in the configuration of the embodiment, the determining processing by the determining module 31 is applied to a program 21 registered in the program list 22. Accordingly, enlargement of the characters A is suppressed during execution of a program 21 that does not require enhancing the visibility of the characters A (enlarging the character A). Further, in the case where a program 21 that is not registered in the program list 22 is activated, the photographing module 15 is not driven. This is advantageous in suppressing electric power consumption.

First Modification

Figure 6:
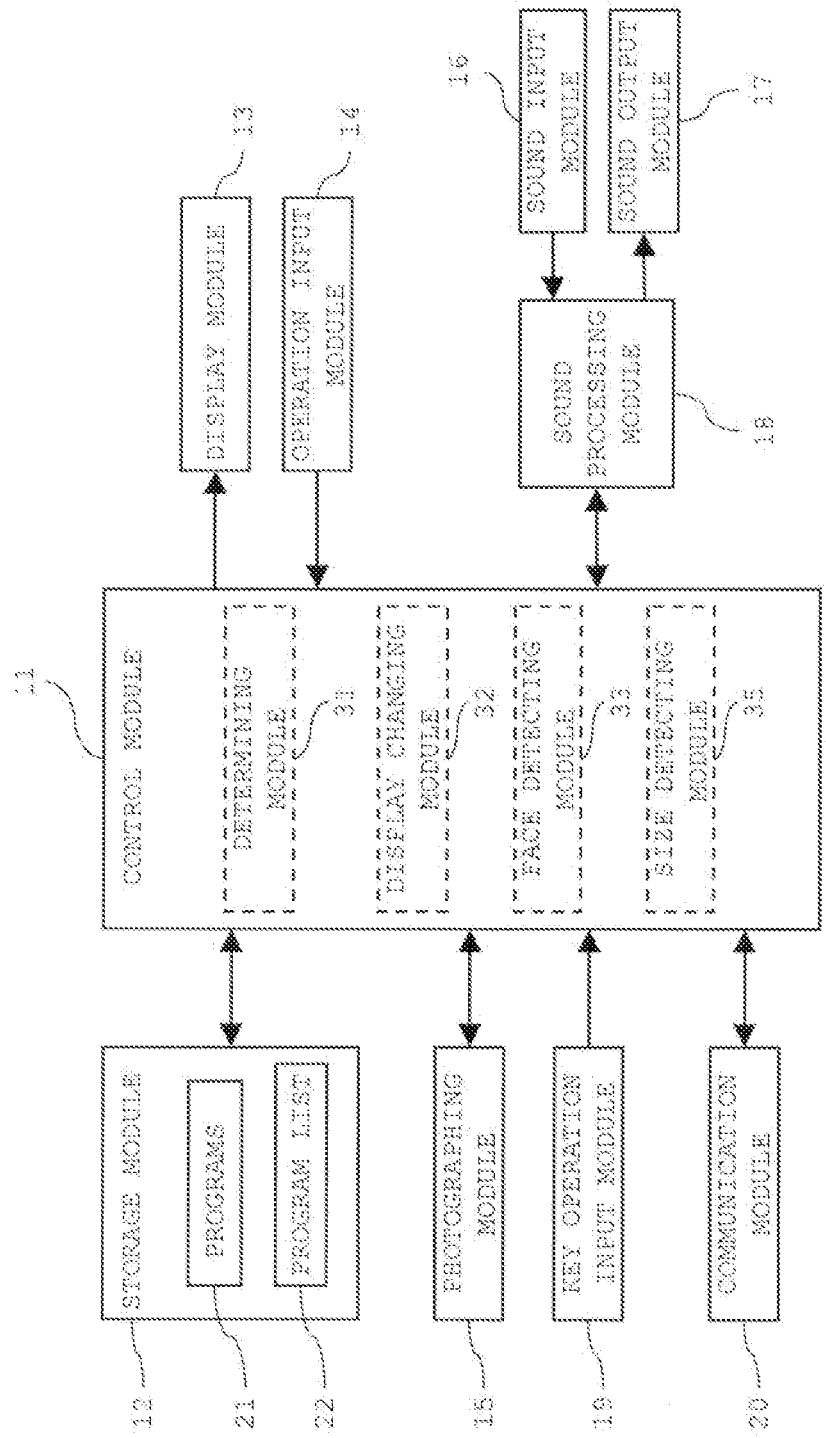
FIG. 6 is a block diagram showing the overall configuration of a mobile phone in a first modification.

FIG. 6 is a block diagram showing the overall configuration of a mobile phone 1 in the first modification. In the block diagram shown in FIG. 6, the age estimating module 34 shown in the block diagram of FIG. 2A is replaced by a size detecting module 35. The size detecting module 35 is implemented as a function of a program to be executed by a control module 11.

Figures 7A, 7B, 7C:
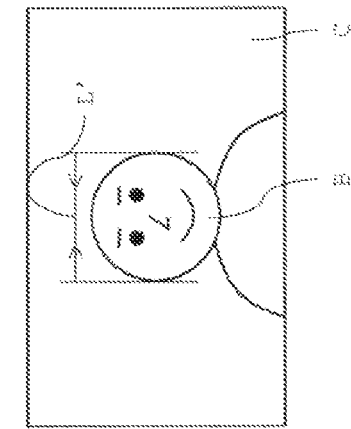
FIGS. 7A through 7C are diagrams each showing an example of a distance between a display surface and a user's face.
Figures 7D, 7E, 7F:
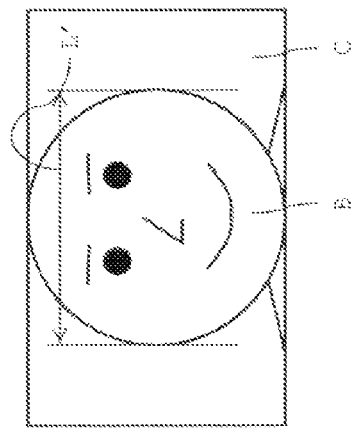
FIGS. 7D through 7F are diagrams each showing a photographed image at each distance in the first modification.

FIGS. 7A through 7C are diagrams each showing a distance between a display surface 3 and a user's face B. FIGS. 7D through 7F are diagrams each showing an example of a photographed image C, in which the distance between the display surface 3 and the user's face B coincides with the distance shown in each diagram of FIGS. 7A through 7C.

The size detecting module 35 detects the size of the area corresponding to a face B included in the photographed image C, as shown in FIGS. 7D through 7F. Specifically, the size detecting module 35 detects the width L of the user's face B in the photographed image C, as a quantity representing the size of the area corresponding to the face B.

The width L' (see FIG. 7E) to be detected by the size detecting module 35 in the case where the user's face B comes close to the display surface 3 from the state shown in FIG. 7A to the state shown in FIG. 7B is larger than the width L (see FIG. 7D) detected by the size detecting module 35 before the user's face B comes close to the display surface 3. Further, the width L' (see FIG. 7F) to be detected by the size detecting module 35 in the case where the user's face B is away from the display surface 3 from the state shown in FIG. 7A to the state shown in FIG. 7C is smaller than the width L (see FIG. 7D).

The size detecting module 35 may be configured to extract various parameters other than the width of the face B, as far as a change in the distance between the display surface 3 and the face B can be evaluated based on the photographed image C acquired by a photographing module 15. For instance, the size detecting module 35 may be configured to extract a distance between characteristic portions of the user's face such as the eyes, the nose, and the ears, or a largeness of the area of the entirety of the face B, or a largeness of the area of a specific portion of the face B, as a quantity representing the size of the area corresponding to the face B in the photographed image C.

In the modification, a determining module 31 determines that the user has difficulty in browsing the screen, in the case where a change amount of the width of the face detected by the size detecting module 35 exceeds a predetermined threshold value within a predetermined period.

Figure 8:
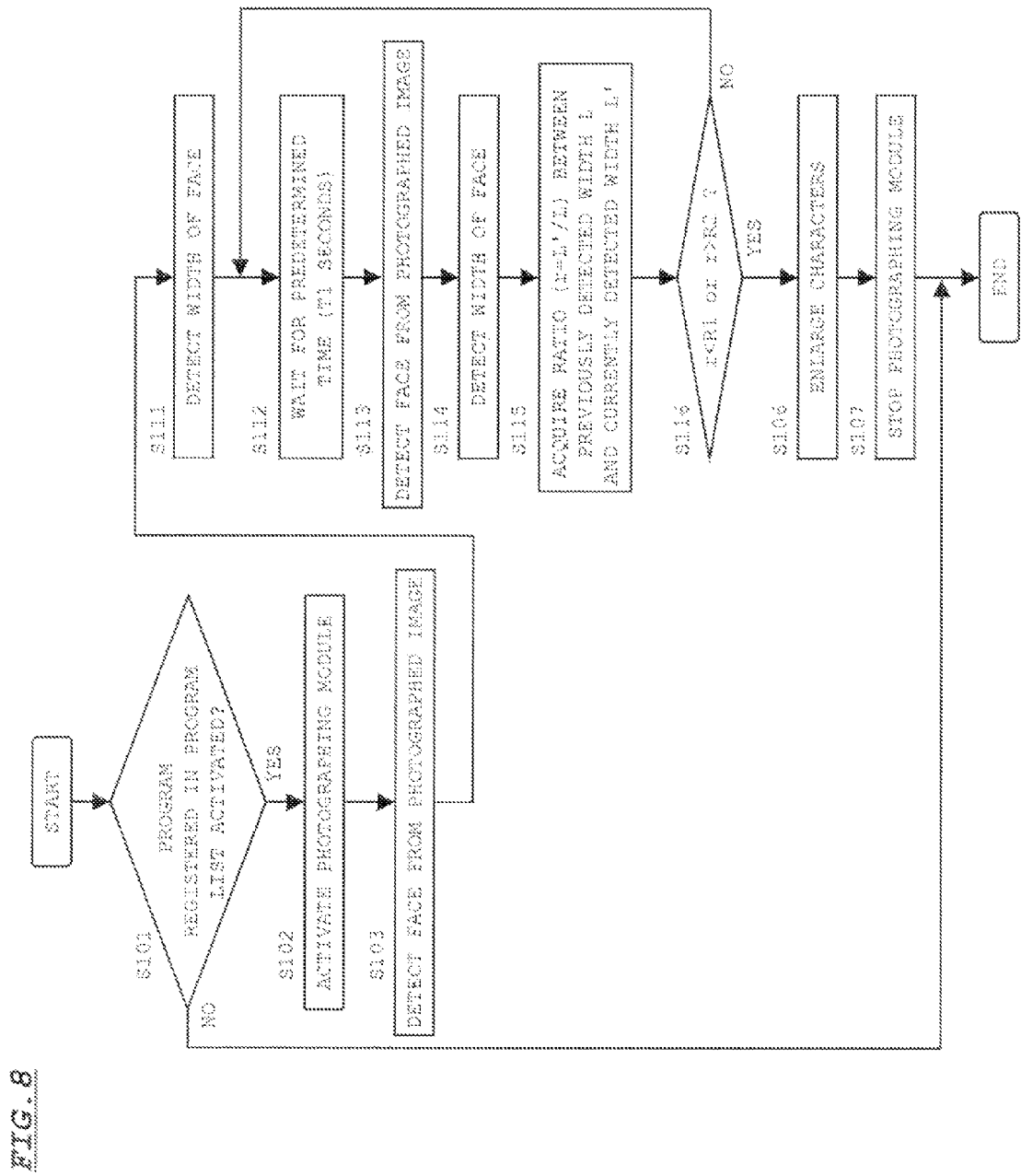
FIG. 8 is a flowchart showing a display control processing in the first modification.

FIG. 8 is a flowchart showing a display control processing in the modification. The flowchart shown in FIG. 8 is a flowchart, in which the processings of Steps S104 and S105 in the flowchart shown in FIG. 5 are replaced by processings of Steps S111 through S116.

After a user's face is detected from a photographed image C acquired by the photographing module 15 (S103), the size detecting module 35 detects the width L of the face B (S111).

After the width L of the face B is detected, the control module 11 waits for a predetermined time T1 (S112). The duration of the predetermined time T1 is set in advance approximately to a duration of a time (e.g. several hundred milliseconds to several seconds) required for the user to change the distance between the display surface 3 and the face due to e.g. a reason that the user has difficulty in reading the characters A displayed on the display surface 3.

After the predetermined time T1 elapses, a face detecting module 33 detects a face B from a photographed image C in the same manner as described in the processing of Step S103 (S113). The size detecting module 35 detects the width L' of the face B detected in Step S113 in the same manner as the processing of Step S111 (S114).

The determining module 31 determines whether the change amount between the two widths L and L' detected in Step S111 and Step S114 is equal to or larger than a predetermined threshold value. Firstly, the determining module 31 acquires a ratio: r=L'/L between the two widths L and L' by a computation (S115), and determines whether the ratio r satisfies the condition: r<R1 or r>R2 (S116).

In this example, R1 and R2 are threshold values e.g. R1=0.9 and R2=1.1. The threshold value R1 may be set in the range of from about 0.5 to 0.95, for instance. The threshold value R2 may be set to 1/R1, or in the range of from about 1.05 to 2, for instance.

In the case where the face B comes close to the display surface 3 from the state shown in FIGS. 7A and 7D to the state shown in FIGS. 7B and 7E, for instance, the ratio r≈1.5 is acquired. In this case, it is determined that r>R2 (S116: YES).

Likewise, in the case where the face B is away from the display surface 3 from the state shown in FIGS. 7A and 7D to the state shown in FIGS. 7C and 7F, for instance, the ratio r≈0.8 is acquired. In this case, it is determined that r<R1 (S116: YES).

In the case where the user fixes the face with respect to the display surface 3, the acquired ratio r is substantially equal to one. In this case, the determination result in Step S116 is negative, and the control returns to the processing of Step S112. In this case, the processings of Steps S112 through S116 are repeatedly executed until the determining module 31 determines that the determination result is positive in Step S116.

In the case where the processings of Steps S112 through S116 are repeatedly executed, the ratio r=L'/L may be acquired in Step S115, based on the width L detected in the processing of previously executed Step S114 and based on the width L' to be detected in the processing of currently executed Step S114, in place of Step S111. In this case, the determining module 31 executes the determining processing in Step S116, based on the ratio r (S116).

In the case where the ratio r satisfies r>R2, it is regarded that the user's face B is away from the display surface 3 to read the characters A more clearly, because the user has difficulty in reading the characters A on the screen at the first-time display position. Further, in the case where the ratio r satisfies r<R1, it is regarded that the user's face B comes close to the display surface 3 to read the characters A more clearly, because the user has difficulty in reading the characters A on the screen at the first-time display position.

Accordingly, in the case where the determining module 31 determines that the ratio r satisfies r>R2 or r<R1 (S116: YES), the display changing module 32 enlarges the characters A on the screen currently displayed on the display surface 3, as shown in FIG. 4B (S106).

As described above, in the above configuration of the modification, in the case where the distance between the display surface 3 and the user's face B is changed (the user's face is away from the display surface 3 or comes close to the display surface 3) due to e.g. a reason that the user has difficulty in reading the characters A on the screen displayed on the display surface 3, the characters A on the screen are automatically enlarged. Thus, a current display manner of a screen displayed on the display surface 3 is changed to a display manner that enhances the visibility of the characters A, as necessary, in a condition that the user has difficulty in browsing a screen displayed on the display surface 3, and accordingly, the user wishes to enhance the visibility of the characters A.

Second Modification

Figure 9:
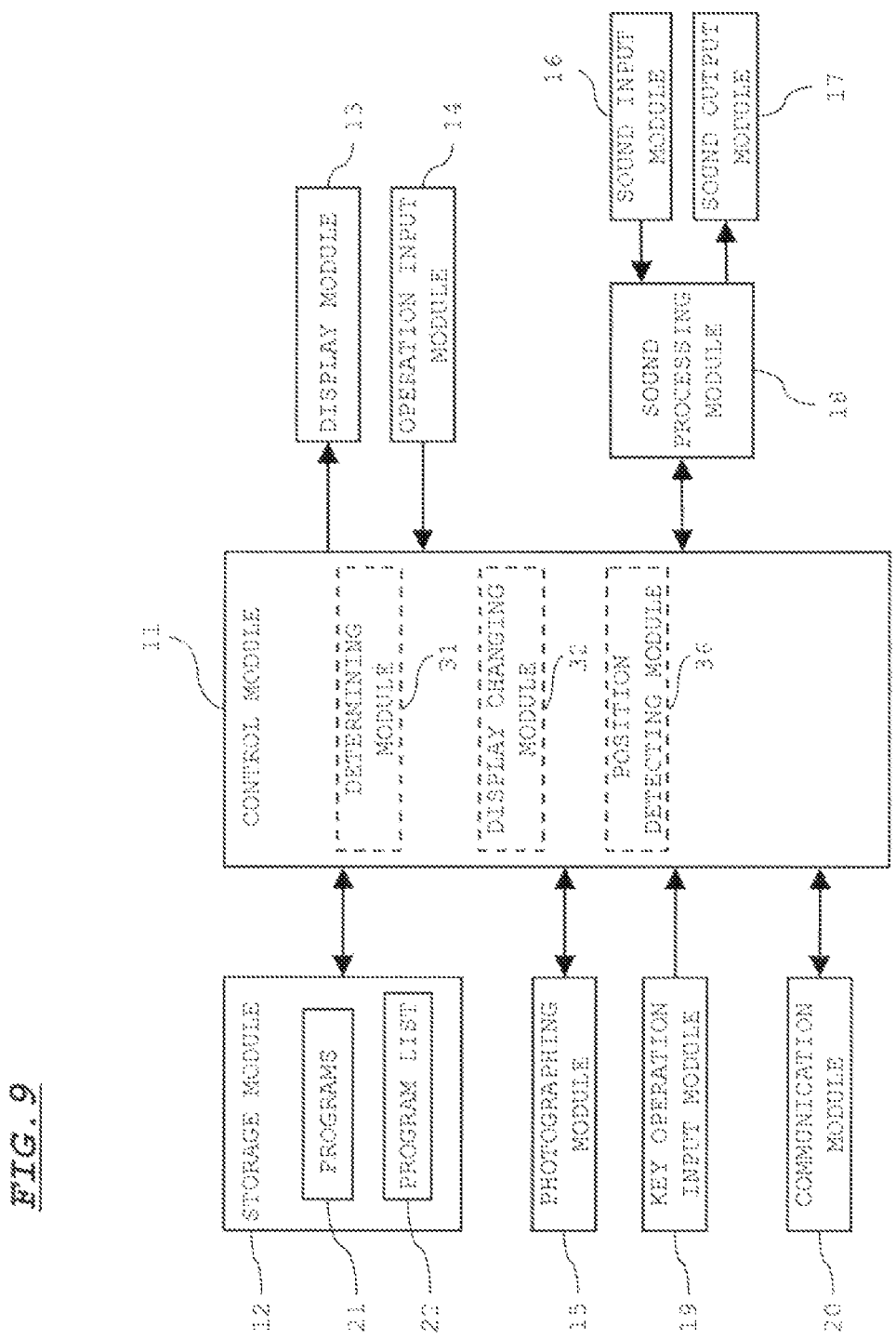
FIG. 9 is a block diagram showing the overall configuration of a mobile phone in a second modification.

FIG. 9 is a block diagram showing the overall configuration of a mobile phone 1 in the second modification. In the block diagram shown in FIG. 9, the face detecting module 33 and the age estimating module 34 shown in the block diagram of FIG. 2A are deleted, and a position detecting module 36 is added. The position detecting module 36 is implemented as a function of a program to be executed by a control module 11.

The position detecting module 36 detects a viewing position on a display surface 3 by a well-known method (disclosed in e.g. JP-A 2002-99386).

For instance, the position detecting module 36 detects a gazing position of the user, in other words, a viewing position of the user on the display surface 3, based on an image of the eyes of the user included in a photographed image C to be acquired by a photographing module 15. The position detecting module 36 specifies a viewing position, with use of e.g. a coordinate relating to X-axis direction and Y-axis direction shown in FIG. 1.

The position detecting module 36 specifies a viewing direction of the user, based on the aforementioned image of the eyes by extracting information on e.g. the positions or outlines of the upper eyelids, the lower eyelids, or the irises of the eyes. Then, the position detecting module 36 detects a viewing position on the display surface 3 based on the specified viewing direction.

The photographing module 15 may be further provided with an infrared camera. In the modification, the position detecting module 36 is operable to detect, from an image photographed by the infrared camera, a viewing direction by detecting e.g. the position of the pupils of the photographed eyes.

FIG. 10A is a diagram for describing a viewing position on the display surface 3. In the case where the user gazes at a position P1 shown in FIG. 10A, the position detecting module 36 detects the position P1 as a viewing position. Specifically, the position detecting module 36 detects a coordinate (X1, Y1) representing the viewing position P1 on the display surface 3. In the case where the user gazes at a position P2 or P2' shown in FIG. 10A, the position detecting module 36 detects a coordinate (X2, Y2) or (X2', Y2') representing the position P2 or P2'.

In the modification, a determining module 31 determines that the user has difficulty in browsing the screen, in the case where the viewing position to be detected by the position detecting module 36 is substantially stopped for a predetermined time or longer.

FIG. 10B is a flowchart showing a display control processing in the modification. The flowchart shown in FIG. 10B is a flowchart, wherein the processings of Steps S103 through S105 in the flowchart shown in FIG. 5 are replaced by processings of Steps S121 through S126. The processing of Step S121 is executed after the photographing module 15 is activated (S102).

In Step S121, the position detecting module 36 detects e.g. the viewing position P1 as shown in FIG. 10A. Then, the control module 11 starts measuring a time t2 using a timer (S122). The timer is equipped in the control module 11.

Thereafter, in the case where Step S121 is executed for the second time and thereafter, the control module 11 starts measuring a time t2 from zero second in Step S122.

In Step S123, the position detecting module 36 detects the viewing position P2 in the similar manner as in Step S121.

The determining module 31 detects a distance d between the two detected viewing positions P1 and P2, based on the coordinates (X1, Y1) and (X2, Y2) representing the viewing positions P1 and P2 (S124). Further, the determining module 31 determines whether the detected distance d is equal to or smaller than a predetermined threshold value D (S125). Specifically, the determining module 31 determines whether the viewing position P2 lies in a circular region (the region surrounded by the broken line in FIG. 10A) having a radius D with respect to the viewing position P1 as a center.

In this example, the threshold value D is set to such a value range within which the viewing position is allowed to move when the user continues to gaze at a certain position on the display surface 3. In other words, in the case where the user continues to gaze at a certain position on the display surface 3 during a period when the viewing positions are detected in Step S121 and Step S123, the distance between the two detected viewing positions is kept in a range that does not exceed the threshold value D. Thus, in the case where the user has difficulty in reading the characters A on the screen because the characters are too small, the user is likely to continue to gaze at the position of the characters A which the user particularly has difficulty in reading.

In the case where the viewing position P2 is out of the circular region as shown in FIG. 10A, the determining module 31 determines that the determination result of Step S125 is negative, based on a determination that the user has difficulty in browsing the screen (S125: NO). In this case, the processing of detecting the viewing positions P1 and P2 is executed again, and the determining module 31 determines whether a distance d between the newly detected viewing positions is equal to or smaller than the threshold value D.

For instance, in the case where the viewing position P1 is detected in Step S121, and then a viewing position P2' shown in FIG. 10A is detected in Step S123, the viewing position P2' lies within the aforementioned circular region. Accordingly, the determining module 31 determines that the distance d' between the viewing positions P1 and P2' detected in the above case satisfies the condition: d'≤D (S125: YES). In this case, the determining module 31 further determines whether the time t2 being measured is equal to or larger than a predetermined threshold value T2 (S126).

In this example, the threshold value T2 is set to such a value capable of detecting that the user continues to gaze at e.g. the characters A displayed at a certain position on the display surface 3. For instance, the threshold value T2 is set to a value in the range of from several seconds to ten and several seconds.

In the case where the determining module 31 determines that the time t2 being measured is equal or larger than the threshold value T2 (S126: YES), the display changing module 32 enlarges the characters A on the screen displayed on the display surface 3, based on a determination that the user has difficulty in browsing the screen (S106).

In the case where the determining module 31 determines that the time t2 being measured is smaller than the threshold value T2 (S126: NO), the control returns to Step S123, based on a determination that the user does not have difficulty in browsing the screen; and the position detecting module 36 executes a processing of detecting the viewing position P2.

As described above, in the configuration of the modification, in the case where the user continues to gaze at a certain position on the display surface 3, the characters A on the screen are automatically enlarged. Thus, a current display manner of a screen displayed on the display surface 3 is changed to a display manner that enhances the visibility of the characters A, in a condition that the user has difficulty in browsing a screen displayed on the display surface 3, and accordingly, the user wishes to enhance the visibility of the characters A.

Third Modification

Figure 11B:
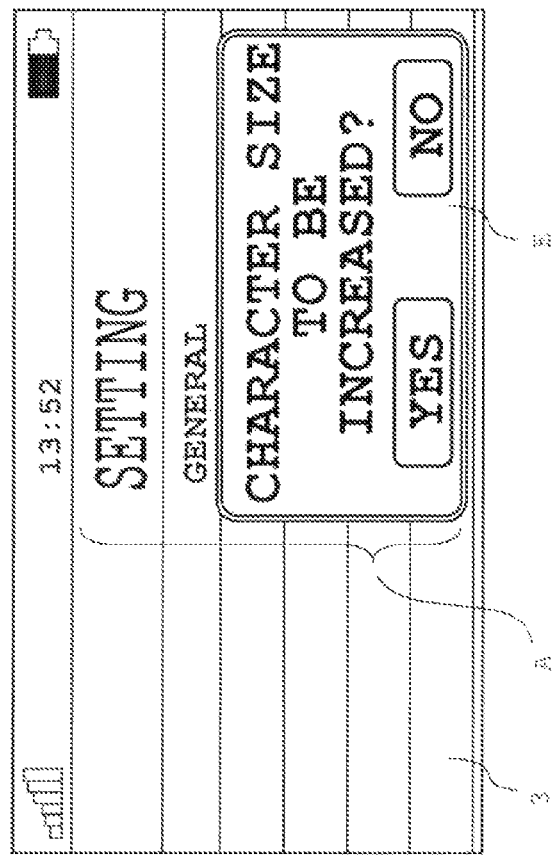
FIG. 11B is a diagram showing an example of an image to be displayed on a display surface for asking a user whether character enlargement is necessary in the third modification.
Figure 11A:
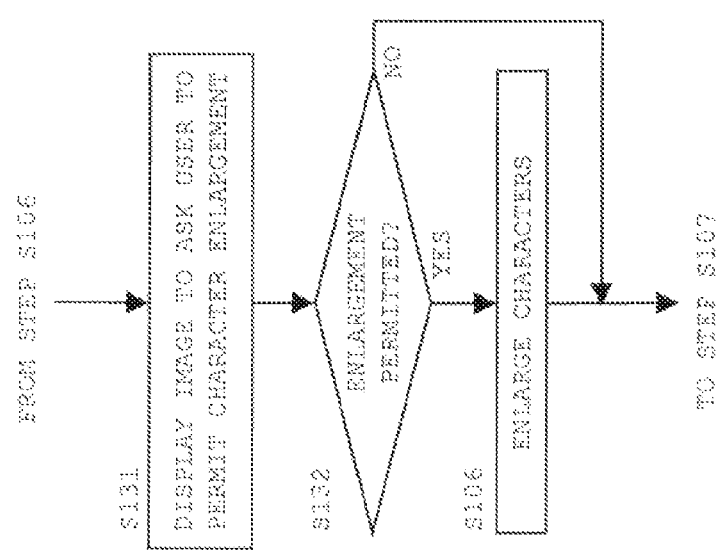
FIG. 11A is a flowchart showing a display control processing in a third modification.

FIG. 11A is a flowchart showing a display control processing in the third modification. In the flowchart shown in FIG. 11A, processings of Steps S131 and S132 are added before Step S106 in the flowchart shown in FIG. 5. Referring to FIG. 11A, illustration of steps identical to the steps shown in FIG. 5 is omitted.

FIG. 11B is a diagram showing an example of an image E, displayed on a display surface 3, which suggests the user for enlargement of the characters A and asks the user to permit enlargement of the characters A in the modification.

A display changing module 32 overlaps and displays the image E shown in FIG. 11B on a screen currently displayed on the display surface 3 before executing the processing of enlarging the characters A on a screen in Step S106 (S131), and suggests the user for enlargement of the characters A. The image E includes a text asking the user to permit enlargement of the characters A. Preferably, the image E may be displayed on the display surface 3 with such a size that the user can read the text without difficulty, for instance, with a font and a size larger than those of the smallest character or those of an average-sized character on the currently displayed screen.

In the case where an operation input module 14 detects a user's manipulation of permitting enlargement of the characters A (a user's manipulation of touching the region "YES" in the image E) (S132: YES), the display changing module 32 enlarges the characters A on the screen currently displayed on the display surface 3 in accordance with the user's intention (S106). In the case where the operation input module 14 detects a user's manipulation of not permitting enlargement of the characters A (a user's manipulation of touching the region "NO" in the image E) (S132: NO), the display changing module 32 proceeds to the processing of Step S107 in accordance with the user's intention, based on a determination that enlargement of the characters A is not necessary.

In the configuration of the modification, enlargement of the characters A on a screen is automatically suggested to the user, as necessary, in accordance with a determination result by the determining module 31. Thus, the user is allowed to permit or cancel enlargement of the characters A on the screen merely by user's manipulation in response to the suggestion.

The configuration of the modification is also applicable to the first modification and the second modification, in addition to the embodiment.

Fourth Modification

Figure 12A:
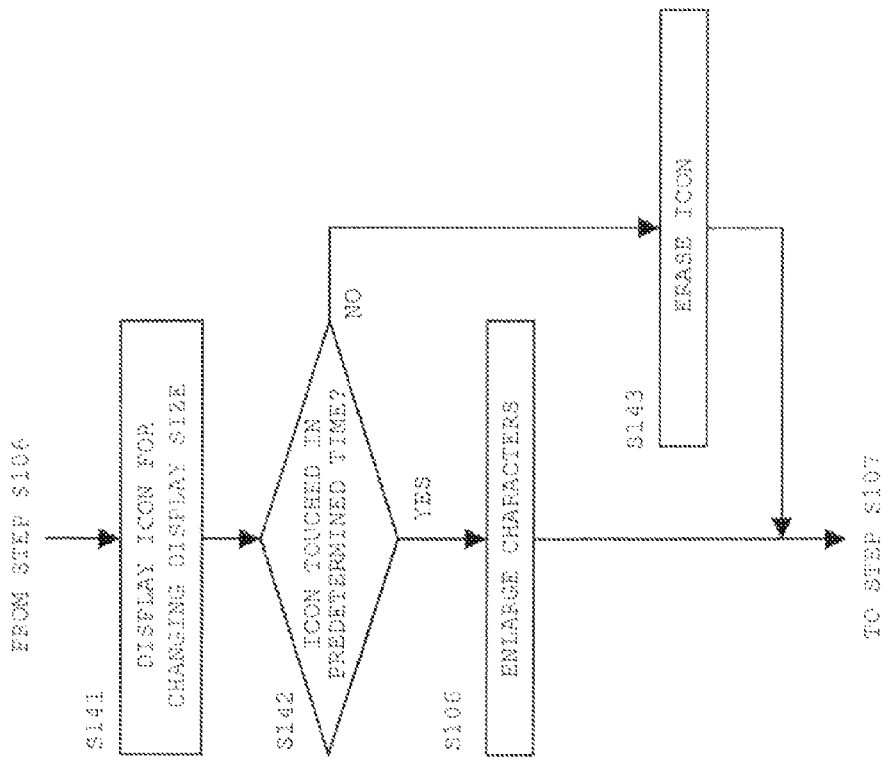
FIG. 12A is a flowchart showing a display control processing in a fourth modification.

FIG. 12A is a flowchart showing a display control processing in the fourth modification. In the flowchart shown in FIG. 12A, the processings of Steps S131 and S132 in the flowchart shown in FIG. 11A are replaced by processings of Steps S141 through S143.

Figure 12B:
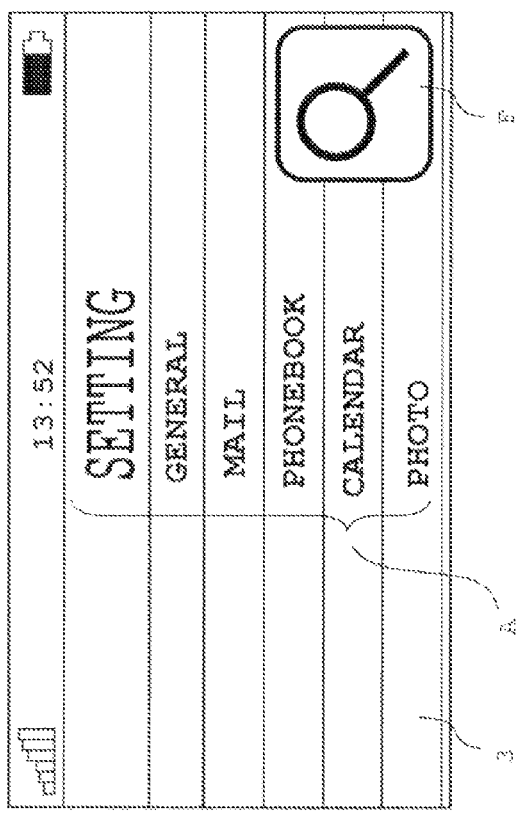
FIG. 12B is a diagram showing an example of an icon for use in character enlargement on a screen in the fourth modification.

FIG. 12B is a diagram showing an example of an icon F for use in enlarging the characters A on a screen in the modification. The icon F includes an image of a reading glass representing enlarging the display contents.

A display changing module 32 overlaps and displays the icon F shown in FIG. 12B on a screen currently displayed on a display surface 3, and assigns, to the operation represented by the icon F, a function of executing the processing (S106) of enlarging the characters A on the screen (S141). The display changing module 32 displays the icon F at e.g. a lower right corner on the screen. Preferably, the icon F may be displayed with such a size that the user finds and manipulates the icon F without difficulty.

In the case where an operation input module 14 detects an input to the icon F during a predetermined time (e.g. from several seconds to ten and several seconds) (S142: YES), the display changing module 32 erases the icon F, and enlarges the characters A on a screen currently displayed on the display surface 3 in response to user's manipulation (S106).

In the case where the operation input module 14 does not detect an input to the icon F during the predetermined time (S142: NO), the display changing module 32 erases the icon F (S143) based on a determination that enlargement of the characters A is not necessary; and the control proceeds to the processing of Step S107.

In the configuration of the modification, enlargement of the characters A on a screen is automatically suggested to the user by indication of the icon F in accordance with a determination result by the determining module 31. Thus, the user is allowed to permit enlargement of the characters A on a screen merely by manipulating (tapping) the on-screen icon F.

The configuration of the modification is also applicable to the first modification and the second modification, in addition to the embodiment.

Others

The embodiment and the modifications of the invention have been described as above. The invention is not limited to the foregoing embodiment, and the embodiment of the invention may be modified in various ways other than the above.

The configurations of the embodiment and the first and second modifications may be combined with each other. In this case, it is possible to combine two or more of the determination conditions relating to the determining processings by the determining modules 31 in the embodiment and in the first and second modifications by conditional binary operators such as "and" and "or". For instance, in the case where the determination condition (y≥Y, see FIG. 5) in the embodiment, and the determination condition (r<R1 or r>R2, see FIG. 8) in the first modification are combined, the determining module 31 determines whether the condition: y≥Y, and (or) r<R1 or r>R2 is satisfied in Step S116.

In the configurations of the first and second modifications, unless the determining module 31 determines that the user has difficulty in browsing a screen, the display control processing (see FIG. 5 and FIG. 8) is continued to be executed. Alternatively, the display control processings in the first and second modifications may be automatically finished after lapse of a predetermined time from the start of execution of the processing. In this configuration, the driving time of the photographing module 15 can be shorten, and electric power consumption is suppressed.

Figure 13A:
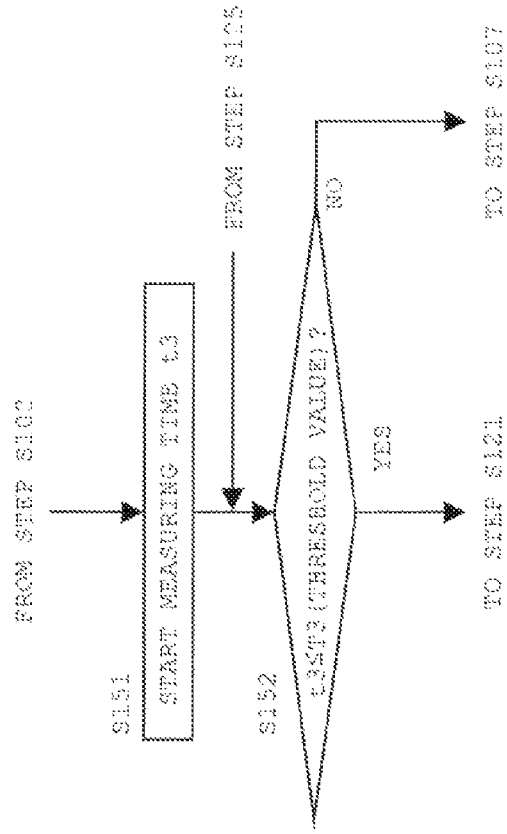
FIGS. 13A and 13B are flowcharts showing display control processings in other modifications.

For instance, processings of Steps S151 and S152 may be added to the flowchart shown in FIG. 8 relating to the first modification, as shown in FIG. 13A. In the above modification, in Step S151, the control module 11 starts measuring a time t3 using a timer (S151). Then, in the case where the time t3 exceeds a predetermined threshold value T3 during a period when the processings of Steps S112 through S116 are repeatedly executed (S152: YES), the control module 11 goes out of the processing loop from Step S112 through S116 which are repeatedly executed. By performing the above operation, the display control processing is automatically finished upon lapse of T3 seconds from the start of execution of the display control processing.

Figure 13B:
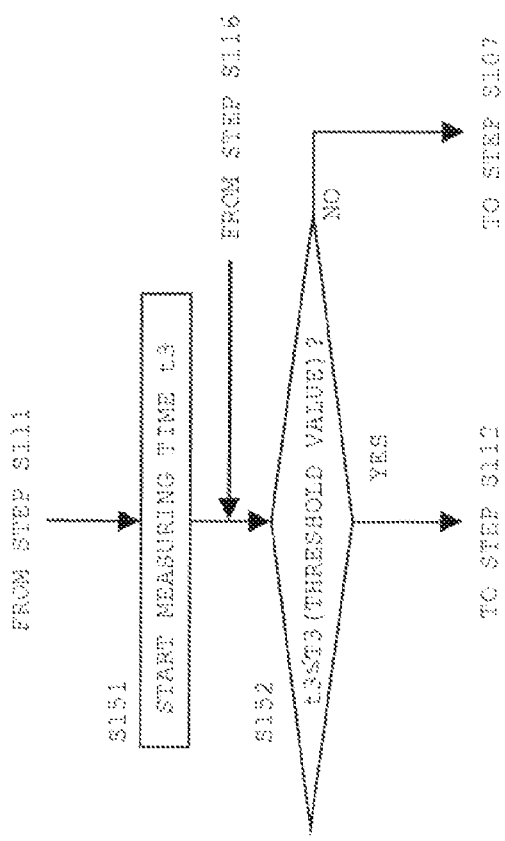
Figure 14B:
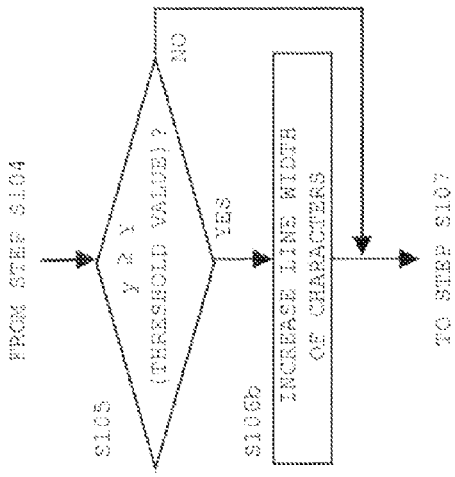
FIGS. 14A through 14D are flowcharts showing display control processings in other modifications.
Figure 14D:
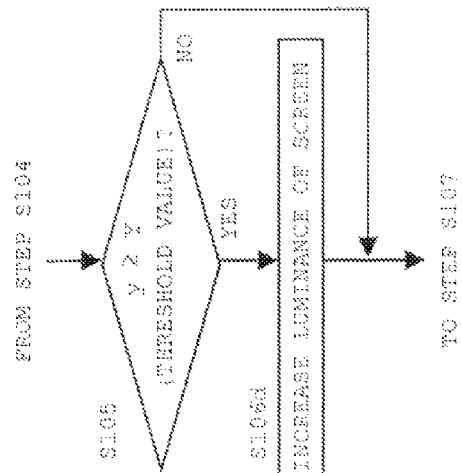
Figure 14A:
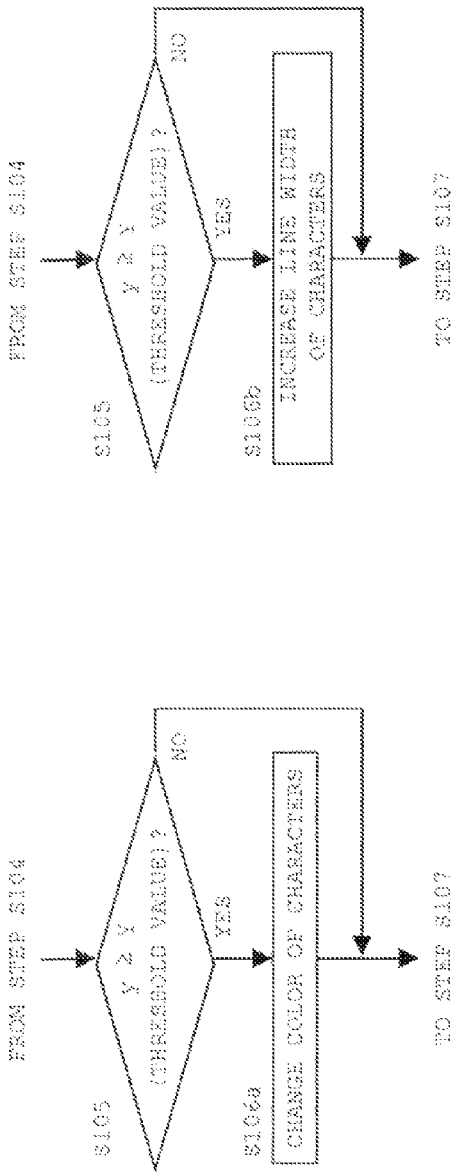
Figure 14C:
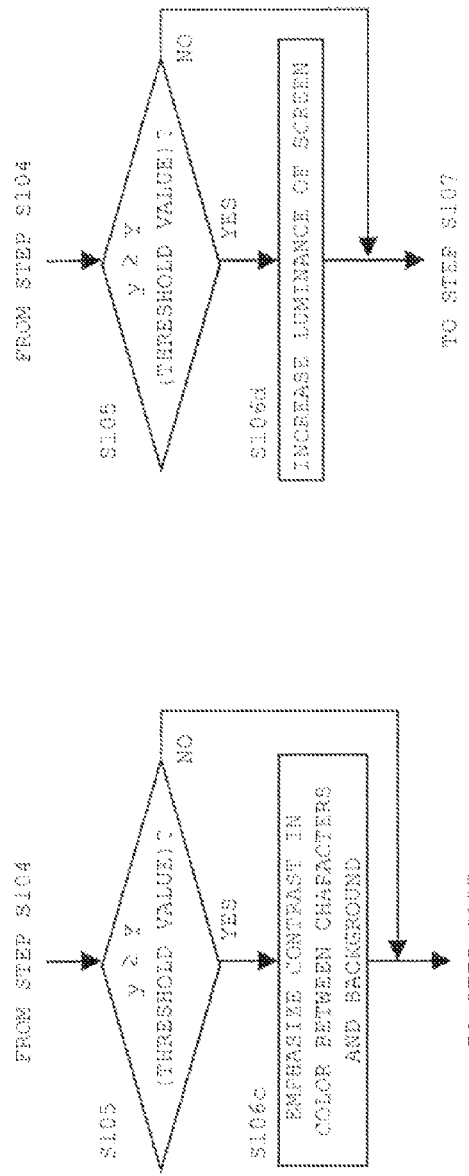

A configuration substantially the same as above may also be applied to the third modification. For instance, Steps S151 and S152 may be added to the flowchart shown in FIG. 10B relating to the first modification, as shown in FIG. 13B.

Further, the display control processings described in the embodiment and in the first through fourth modifications are started to be executed in response to start of execution of a program 21 in response to user's manipulation. Alternatively, a display control processing may be executed e.g. at an interval of a predetermined time, even during execution of a program, in addition to the timing in response to start of execution of a program 21 by user's manipulation.

The determination condition for determining whether enlargement of the characters A on a screen is necessary by the determining module 31 is not limited to the conditions described in the embodiment and in the first through fourth modifications. The determination condition may be configured by using various information relating to a photographed image acquired by the photographing module 15. In the case where it is possible to execute a processing of detecting a facial expression of the user from an image of the face B in the photographed image C, such as a processing of detecting user's gesture e.g. frowning, necessity of enlargement of the characters A may be determined, based on a detected facial expression or based on a change in the facial expression.

Further alternatively, the determination condition for determining whether enlargement of the characters A on a screen is necessary by the determining module 31 may include a requirement based on information other than a photographed image. For instance, even in the case where it is preferable to enlarge the characters A on a screen in accordance with a condition based on a photographed image C, the determining module 31 may be configured to determine that enlargement of the characters A on a screen is not necessary during a period when user's manipulation of the operation input module 14 or the key operation input module 19 is detected.

In the embodiment and in the first through fourth modifications, a determining processing by the determining module 31 is applied to a program 21 registered in the program list 22. Alternatively, the program list 22 may be configured in such a format as to register a program 21 to which the aforementioned determining processing is not applied. The program list 22 may be configured to determine whether the aforementioned determining processing is applied to each program 21.

Further, as far as the data is configured in a format capable of determining whether the aforementioned determining processing is applied to each program 21, data for use in determination may be stored in the storage module 12 in a format different from the format of the program list 22. For instance, the format may be configured to include information for use in deciding whether the determining processing by the determining module 31 is applied to a target program 21 among the programs 21 stored in the storage module 12. Further alternatively, data for use in determination may be composed of data indicating a requirement for specifying a target program to which the determining processing by the determining module 31 is applied, from among the programs 21. In the above modification, the control module 11 determines whether the determining processing by the determining module 31 is applied to the program 21, based on the requirement (data for use in determination).

In the embodiment and in the first through fourth modifications, the photographing module 15 is activated in response to activation of a program registered in the program list 22 (from Step S101 to Step S102). Alternatively, the photographing module 15 may be activated at a predetermined timing after activation of a program. For instance, in the case where the operation input module 14 does not detect user's manipulation on an execution screen of an activated program for a predetermined time (e.g. several seconds to ten and several seconds), the photographing module 15 may be activated. Shortening the operation time of the photographing module 15 is advantageous in suppressing electric power consumption required for operating the photographing module 15.

In the embodiment and in the first through fourth modifications, in enlarging the characters (S106), the display surface 3 may be operable to display an image such as a bar for allowing the user to adjust the magnification ratio of the characters. The above modification is advantageous in allowing the user to display the characters A with an intended size. In displaying an image for use in adjusting the magnification ratio, operation means for allowing the user to cancel enlargement may be provided to the user. An image for use in adjusting the magnification ratio may be displayed in combination with the display of the image E (see the third modification) for use in asking the user to permit character enlargement, or the display of the icon F (see the fourth modification) for use in character enlargement.

In the embodiment and in the first through fourth modifications, the display changing module 32 enlarges the characters A on a screen displayed on the display surface 3. Alternatively, the display changing module 32 may be configured to change the display manner of a screen by various display changing means for enhancing the visibility of the characters A, in addition to or in place of enlarging the characters A. For instance, as shown in FIGS. 14A through 14D, the display changing module 32 may perform the following display change operations on a screen displayed on the display surface 3, in place of enlarging the characters A (see S106 of FIG. 5). Specifically, the color of the characters A may be emphasized (e.g. the color of the characters A is changed to the complementary color of the color of the background, see S106*a* of FIG. 14A); the font of the characters A may be emphasized (e.g. the line width of the characters A is increased, or the font type is changed from Ming font to Gothic font, see S106*b* of FIG. 14B); the contrast in color between the characters A and the background may be emphasized (e.g. the color of the characters A and the color of the background are changed to satisfy such a relation that the colors are substantially complementary to each other, see S106*c* of FIG. 14C); or the luminance of the screen may be increased (see S106*d* of FIG. 14D). Further alternatively, the display manner of a screen may be changed in such a way as to enhance the visibility of the characters A by combining two or more of the display changing means with respect to the aforementioned display change operations of enlarging the characters A, emphasizing the color of the characters A, changing the font of the characters A, emphasizing the contrast in color between the characters A and the background, and increasing the luminance. The configuration of changing the display manner of a screen as described above may also be applied to the first through fourth modifications.

In the embodiment, the invention is applied to mobile phones called smartphones. Alternatively, the invention may be applied to other types of mobile phones such as straight-type mobile phones, foldable mobile phones, and slidable mobile phones.

Furthermore, the invention is not limited to the mobile phones. Alternatively, the invention is applicable to mobile terminal devices such as PDAs (Personal Digital Assistants), tablet PCs, and electronic book readers.

The embodiment of the invention may be changed or modified in various ways as necessary, as far as such changes and modifications do not depart from the scope of the claims of the invention hereinafter defined.

What is claimed is:

1. A mobile terminal device, comprising:
   a display module which displays a screen;
   a photographing module which is configured to face substantially the same direction as the screen;
   a determining module which determines, based on an image photographed by the photographing module, whether a state of a user facing the screen coincides with a predetermined determination condition indicating that the user has difficulty in browsing the screen;
   a display changing module which changes a current display manner of the screen to a display manner that enhances visibility of characters displayed on the screen, as compared with the current display manner, based on a determination result by the determining module that the state of the user coincides with the determination condition; and
   a size detecting module which detects a size of a facial area corresponding to the face of the user, the facial area being included in the image,
   wherein the determination condition includes a requirement that a change amount of the size of the facial area within a predetermined period is equal to or larger than a predetermined threshold value.

2. The mobile terminal device according to claim 1, wherein the display changing module performs at least one of changes comprised of enlarging the characters, emphasizing a color of the characters, emphasizing a font of the characters, emphasizing a contrast in color between the characters and a background of the characters, and increasing a luminance of the screen, with respect to the screen, based on the determination result by the determining module that the state of the user coincides with the determination condition.

3. The mobile terminal device according to claim 1, further comprising: an age estimating module which estimates the age of the user based on the image, wherein the determination condition includes a requirement that the age estimated by the age estimating module exceeds a predetermined threshold value.

4. The mobile terminal device according to claim 1, further comprising: a storage module which stores information for use in determining whether a program for displaying the screen is a program to which changing the display manner of the screen by the display changing module is applied, wherein the display changing module changes the current display manner of the screen to the display manner that enhances the visibility of the characters displayed on the screen, as compared with the current display manner, based on the determination result by the determining module that the user has difficulty in browsing the screen, in the case where the information shows that changing the display manner of the screen is applied to the program for displaying the screen.

5. A non-transitory storage medium which stores a computer program, the computer program being configured to provide a computer in a mobile terminal device provided with a display module which displays a screen, and a photographing module which is configured to face substantially the same direction as the screen, with
- a function of detecting a size of a facial area corresponding to a face of a user, the facial area being included in an image photographed by the photographing,
- a function of determining, based on the image photographed by the photographing module, whether a state of the user facing the screen coincides with a predetermined determination condition indicating that the user has difficulty in browsing the screen, wherein the determination condition includes a requirement that a change amount of the size of the facial area within a predetermined period is equal to or larger than a predetermined threshold value, and
- a function of changing a current display manner of the screen to a display manner that enhances visibility of characters displayed on the screen, as compared with the current display manner, based on a determination result that the state of the user coincides with the determination condition.

6. A display control method for a mobile terminal device provided with a display module which displays a screen, and a photographing module which is configured to face substantially the same direction as the screen, the method comprising:
- detecting a size of a facial area corresponding to a face of a user, the facial area being included in an image photographed by the photographing module;
- determining, based on the image photographed by the photographing module, whether a state of the user facing the screen coincides with a predetermined determination condition indicating that the user has difficulty in browsing the screen, wherein the determination condition includes a requirement that a change amount of the size of the facial area within a predetermined period is equal to or larger than a predetermined threshold value; and
- changing a current display manner of the screen to a display manner that enhances visibility of characters displayed on the screen, as compared with the current display manner, based on a determination result that the state of the user coincides with the determination condition.

7. The mobile terminal device according to claim 1, further comprising a position detecting module which detects a viewing position of the user on the screen based on the image, wherein the determination condition includes a requirement that the viewing position substantially stops on the screen for a predetermined time or longer.

* * * * *